(12) United States Patent
Kesselman et al.

(10) Patent No.: US 8,738,820 B2
(45) Date of Patent: *May 27, 2014

(54) METHOD AND APPARATUS FOR WIRELESS NETWORK COMMUNICATION WHEREIN A UNIVERSAL SERIAL BUS REQUEST BLOCK (URB) IS GENERATED THAT WILL VARY PARAMETERS THAT CONTROLS WIRELESS TRANSMISSION COMMANDS BETWEEN DEVICES

(75) Inventors: Alex Kesselman, Ramat Gan (IL); Igor Markov, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/065,835

(22) Filed: Mar. 30, 2011

(65) Prior Publication Data
US 2011/0246683 A1 Oct. 6, 2011

Related U.S. Application Data

(62) Division of application No. 12/006,018, filed on Dec. 28, 2007, now Pat. No. 7,930,446.

(51) Int. Cl.
*G06F 13/00* (2006.01)
*H04L 12/28* (2006.01)
*H04M 1/00* (2006.01)

(52) U.S. Cl.
USPC .......... 710/30; 710/15; 710/16; 710/19; 710/33; 710/38; 710/313; 370/392; 370/469

(58) Field of Classification Search
USPC .............................. 710/15–19, 30
See application file for complete search history.

(56) References Cited

U.S. PATENT DOCUMENTS

| | | | |
|---|---|---|---|
| 6,973,512 B1 | 12/2005 | Koeman | |
| 7,349,391 B2 | 3/2008 | Ben-Dor et al. | |
| 7,822,065 B2 | 10/2010 | Lu | |
| 7,930,446 B2 * | 4/2011 | Kesselman et al. | 710/30 |
| 2005/0228933 A1 | 10/2005 | Tsai | |
| 2007/0133590 A1 | 6/2007 | Chun et al. | |
| 2007/0198244 A1 | 8/2007 | King et al. | |
| 2008/0005375 A1 * | 1/2008 | Ying | 710/14 |
| 2008/0056285 A1 | 3/2008 | Quinn et al. | |
| 2008/0071962 A1 | 3/2008 | Yang et al. | |
| 2009/0172210 A1 | 7/2009 | Kesselman et al. | |

OTHER PUBLICATIONS

Yuang, et al., "A Perfectly Stable Contention Access Scheme for Wireless Access Networks," Vehicular Technology Conference, IEEE VTS 54th, vol. 4, (2001), pp. 2163-2167.

Hirofuchi, et al., "USB/IP—A Peripheral Bus Extension for Device Sharing over IP Network", In Proceedings of USENIX Annual Technical Conference, FREENIX, 2005., pp. 47-60.

* cited by examiner

*Primary Examiner* — Tammara Peyton
(74) *Attorney, Agent, or Firm* — Schubert Law Group PLLC

(57) ABSTRACT

In some embodiments a method is disclosed that includes creating a network connection status between a host device and a peripheral network device, determining characteristics of the peripheral device such as receive capacity or a quality of service classification for the transmission and flow control for performing control and data transfers. A transfer is initiated when a uniform serial bus request block (URB) is generated by a host application. The URB can have parameters that can be utilized to generate a transaction over a wireless network providing Quality of Service (QoS) guarantees. Other embodiments are also disclosed.

12 Claims, 3 Drawing Sheets

METHOD AND APPARATUS FOR WIRELESS NETWORK COMMUNICATION WHEREIN A UNIVERSAL SERIAL BUS REQUEST BLOCK (URB) IS GENERATED THAT WILL VARY PARAMETERS THAT CONTROLS WIRELESS TRANSMISSION COMMANDS BETWEEN DEVICES

CROSS-REFERENCES TO RELATED APPLICATIONS

Pursuant to 35 USC §120, this continuation application claims priority to and benefit of U.S. patent application Ser. No. 12/006,018, entitled "Methods And Apparatuses For Wireless Network Communications", filed on Dec. 28, 2007, the disclosure of which is incorporated herein in its entirety for all purposes.

FIELD

Some embodiments disclosed herein relate to the field of computers and more particularly, to the field of wireless network communications.

DETAILED DESCRIPTION OF EMBODIMENTS

Figure 1:
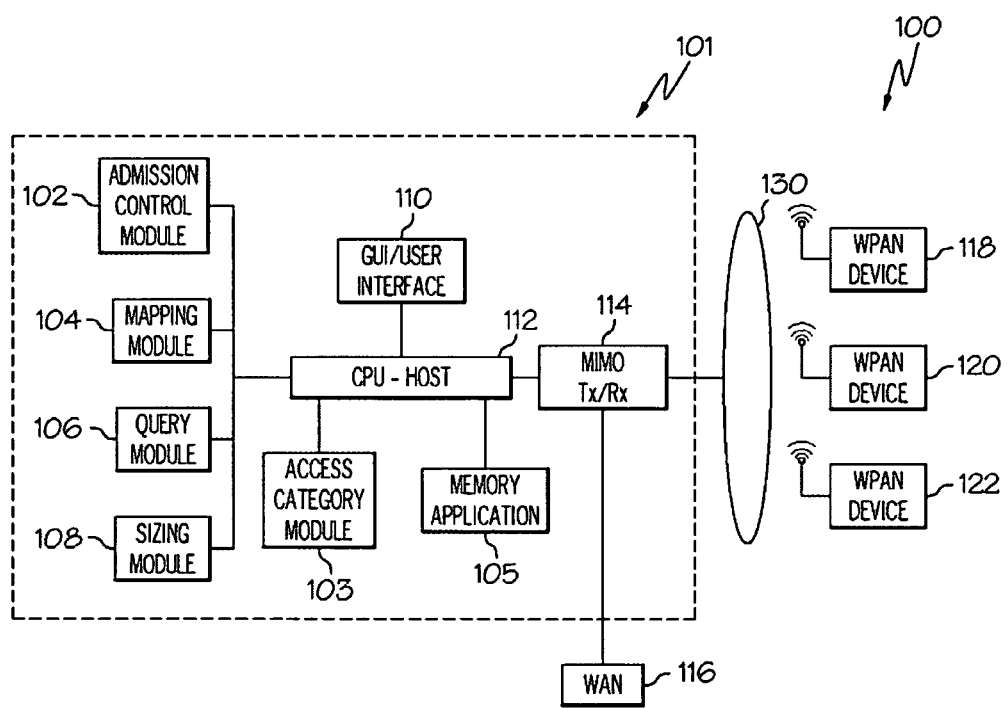
FIG. 1 depicts a block diagram of a communications flow control system.

The following is a detailed description of some of embodiments depicted in the accompanying drawings. The embodiments are in such detail as to clearly communicate an invention. However, the amount of detail offered is not intended to limit the anticipated variations of embodiments; but on the contrary, the intention is to cover all modifications, equivalents, and alternatives falling within the spirit and scope of the some embodiments as defined by the appended claims. While specific embodiments will be described below with reference to particular circuit or logic configurations, those of skill in the art will realize that some embodiments disclosed may advantageously be implemented with other similar configurations.

Most modern personal computers have a uniform serial bus port (USB) that can be utilized for communications between the user's computer and peripheral devices such as a mouse keyboard, printer, disk, etc. The USB engineering specification is facilitated by the USB Promoters Forum Inc. and the original USB 2.0 specification was originally released on Apr. 27, 2000. With over one billion installed computing devices having a USB port, such a communication port is arguably the most successful/utilized interface in the personal computer (PC) history.

The USB configuration has found many important uses. USB connections have gone beyond just being a way to connect peripherals such as cameras, printers, keyboards, personal digital assistants, pointing devices (e.g. a mouse), etc. to a computer. For example, a USB port can also be utilized to connect a computer to a wireless network. One type of wireless network that can utilize a USB port is a wireless personal area network (WPAN). A WPAN is generally a personal area network for interconnecting devices centered around an individual person's workspace (for example in an office or home) in which communications can be conducted without hardwiring devices together.

One important concept in WPAN technology is known as "plugging in." In an ideal setting, when any two WPAN compatible devices come into close proximity to each other, they can automatically set up communications and communicate as if they are hardwired. Another important feature of a WPAN is the ability of devices to "lock out" other devices selectively, preventing needless interference or unauthorized access to information. For example, it would be undesirable for a device in an adjacent WPAN to plug in to the "wrong" WPAN or it would be undesirable to allow an unauthorized individual to eavesdrop on a WPAN.

Wireless technologies are becoming ubiquitous as more and more capable and cost effective &vices appear on the market. The Institute of Electrical and Electronic Engineers (IEEE) standard 802.11n draft 2.0 was approved in March of 2007. 802.11a/b/g/n compatible devices are commonly branded or referred to as WiFi devices. The 802.11n specification defines a radio technology whose characteristics can be utilized in cooperation with traditional USB ports. Such a combination of technologies is commonly referred to as WPAN USB. It is worthy to note that a dongle type transmitter may be placed in a USB port so that a host or a device can become part of a wireless network.

USB 2.0 specifies communication services between a host (usually a personal computer) and a plurality of attached devices. A host can be viewed as a device in networking configuration that can have a unique Internet protocol address and can serve communication needs of devices connected to it. Likewise, in a WPAN the host plays the role of a central coordinator. However, currently WPAN USB systems have a less than perfect USB to WPAN conversion methodology and are generally inefficient and relatively unreliable.

A new layer has been created in the communication protocol referred to as the WPAN layer. The change from a traditional USB 2.0 communications format to a WPAN USB format generally utilizes substantially the same or almost identical function layer to facilitate communications. However, the treatment of USB control parameters such as isochronous and interrupt transfers are adversely affected by the new WPAN layer and such transmission types suffer degradation when utilized for network transmissions. Isochronous communications is one of the four data flow types for USB devices (the others being Control, Interrupt and Bulk).

Generally isochronous transmissions have a transmission data capacity assured for one frame where the transmission reliability is not guaranteed. Such a transmission type is typically utilized for applications that require real-time capacity (voice, movie camera, telephony, etc.). Interrupt transmissions are generally small volume data transmission at preset periodic times where the transmission reliability is guaranteed and it is utilized for applications where small volumes of data are transmitted regularly (keyboard, mouse, joystick, monitor, etc.). Bulk transmissions are generally transmitted during idle times between isochronous and interrupt transmissions. Bulk transmission reliability is guaranteed and bulk transmission are typically utilized by applications where large volumes of data are transmitted irregularly (printer, scanner, digital still camera, storage, etc.). Control transmissions are typically utilized for the transmission/reception of set-up information such as configuration, address data, etc., where the transmission reliability is guaranteed and each function must be supported. Disclosed herein are enhancements to allow USB functions to receive increased reliability and better service in a WPAN layer. Such enhancements include assigning specific USB functions to WPAN channels that provide an acceptable quality of service (QoS) for these USB transfer types.

QoS is a metric that provides a means to "guarantee" a certain level of a specified resource to selected traffic on a network. Quality can be defined as e.g. a maintained level of bandwidth, latency, packet loss, etc. Data packets for various types of network traffic originating from a device can be marked with the QoS type of service. This makes it possible for network routers and switches to e.g. reserve a fixed amount of bandwidth for these types of traffic. The existing WPAN USB QoS is less than perfect because of the structure of the WPAN USB communications layer.

USB 2.0 has flow control built into its low-level protocol. The wired protocol requires the host to poll for a change in status once a flow control non acknowledgement response has been given by the device. USB host controller implementations poll aggressively (often) for a change in data stream readiness. This 'busy-wait' polling is extremely expensive in terms of occupying available bandwidth in the wireless environment; therefore, it is desirable to create a system where the USB network utilizes "a less bandwidth consuming method" for resuming a data stream after a flow-control event. Note that as with USB 2.0, the initial state of all endpoints after any configuration event in the PAN is that they are assumed to be in the 'ready' state.

In some embodiments disclosed herein the system can create a network connection status between a host device and a peripheral network device, and determine a characteristic of the peripheral device such as the receive capacity or a quality of service classification for the future communication. An application can generate a uniform serial bus request block (URB). The URB can have parameters that can be utilized to generate a wireless network control command and the command can be transmitted over a wireless network. In some embodiments an efficient network communication protocol is disclosed that includes a transmission request (token), a handshake reply, and a burst transmission that has a number of packets that are equal to or less than the determined receive capacity. An error detection type handshake can then complete the transaction. In another embodiment USB transmission types that have specific quality specifications can be mapped to WPAN transmission categories that have similar QoS requirements.

In accordance with the present disclosure, a wireless multi-input multi-output transceiver can be connected to a uniform serial bus (USB) and such a configuration can provide wireless communication with multiple peripheral devices to form a wireless personal area network (WPAN). Thus, the disclosed WPAN can utilize established USB communication protocols to control communications between a WPAN host and WPAN compatible peripheral devices. The disclosed system allows a user to connect, configure and operate a network without having to connect cables, configure devices and control each device as the devices are added to the user's WPAN. Accordingly, connecting, configuring, and operating peripheral network components such as printers, storage drives, keyboards, mice, (to name a few), that are compliant with USB WPAN configuration disclosed herein, in a network configuration can be performed efficiently and in a user friendly manner.

One benefit of the disclosed USB WPAN configuration is that in some embodiments no physical port is required to connect these multiple devices. Accordingly, finding an unused USB port should not be a problem with the disclosed system because in some embodiments no physical ports or physical connections are required. In other embodiments a dongle transceiver can be connected to a single USB port and a single port can communicate with multiple peripheral devices.

Referring to FIG. 1 a USB WPAN system 100 with a USB WPAN host 101 is illustrated. The system can include an admission control module 102, access category module 103, a mapping module 104, a query module 106, a sizing module 108, a graphical user interface (GUI) or user interface module 110, a central processing unit (CPU) host 112, memory 105 that can store an application, and a transceiver (Tx/Rx) 114. Transceiver 114 can be a multi-input multi-output type transceiver. Modules 102-108 are generally referred to herein as communication control modules 102-108. In some embodiments, the CPU host 112 on instructions from the application and the user via the GUI 110 can generate communications with the WPAN devices 118-122. The WPAN devices can run multiple applications wherein these applications can be referred to as end points.

In one embodiment, a user can initiate a print command for a document and, assuming WPAN device 118 is a printer, the CPU host 112 could send print commands and the data to be printed can be sent to and received by the printer (i.e. 118). Such communications to the multitude of WPAN devices 118-122 can be accomplished via communications protocols that are prioritized and configured by communication control components 102-108. In other embodiments transceiver 114 can receive transmissions from network 116, for example, a telephone call or a video feed, and can distribute such transmissions to a WPAN compatible devices 118-122 under the control of the components 102-108.

Thus, the system 101 can provide high performance communication flow control for USB application input output (I/O) transfers via a WPAN configuration. In some embodiments, the WPAN USB devices 118-122 can communicate with the host CPU 112 utilizing at least a portion of the USB 2.0 communication protocol standard, published in 2000. The communications, protocol or data flow between the CPU host 112 and the WPAN devices 118-122 as defined herein can be compliant with the USB 2.0 protocol. A WPAN USB communication model can accommodate the USB 2.0 layered architecture beyond the bus layer and can accommodate basic components of the communication flow including the basic data flow and transfer concepts defined in USB 2.0 specification. Such transfer concepts can include the transfer types, pipes and a basic data flow model. This makes the host compatible with legacy devices. Some differences between the operation of the host 101 and a traditional USB 2.0 configuration is that instead of bus 'transaction' types such as token, data, handshake and data flow at the bus level, WPAN USB can apply the same model to the application input/output transfer level serving complete USB request blocks (URBs) to achieve higher bandwidths/higher performance in wireless communications.

Such communications between the WPAN devices 118-122 and the CPU-host 112 can be base on USB communication concepts such as the concept of "pipes" or logical channels that are created between the WPAN devices 118-122 and the CPU host 112. Thus, pipes are considered connections from the host controller (112) to the application or logical entity on the WPAN device 119-122, and this entity is often called an endpoint. A typical WPAN USB device (118-122) can have up to 32 active pipes, 16 into the host controller and 16 out of the controller. Each endpoint can transfer data in one direction only, either into or out of the WPAN device 118-122, so each pipe is uni-directional. Endpoints can be grouped into interfaces and each interface can be associated with a single device function. When a new WPAN USB device 118-122 is connected to the USB host (CPU-host 112), the WAPN USB device enumeration process can be started. The enumeration process is can be initiated by the CPU-host 112 by sending a reset signal to the WPAN device such as device 118.

The speed of the WPAN USB device 118 can be determined as part of the setup or reset signaling to make the "connection." After the reset process, the WPAN USB device 118 setup information can be received by the CPU host 112 and the WPAN device 118 can be assigned a unique host-controller specific 7-bit address. If the WPAN device 118 is supported by the CPU-host 112, the device drivers needed for communicating with the WPAN device 118 can be loaded by the WPAN device 118 and the WPAN device 118 can be set to or logged as having a configured state. If the CPU host 112 is restarted, the enumeration process is repeated for all connected WPAN devices 118-122. The host CPU 112 can poll the WPAN devices in a "round-robin" fashion, so no WPAN USB device 118-122 can transfer data to and from the CPU host 112 without an explicit request from the CPU host 112 controller.

Accordingly, after a WPAN device (118) "connects" with the CPU host 112, the CPU host 112 can control communication flow between the CPU host 112 and the wirelessly connected WPAN USB device(s) 118-122. As stated above, the CPU host 112 can be resident on a user's personal computer. The WPAN USB communication model described below can preserve the USB 2.0 layered communication architecture beyond the bus layer and can preserve basic components of the communication flow including the basic data flow and transfer concepts defined as defined in the USB 2.0 specification while providing more efficient data transfer control. Some of the data flow transfer types (as defined in USB 2.0) that the disclosed system 101 can utilize can include that USB transfer types illustrated in Table 1 below. The transfer types can be integrated with the existing pipe configuration and the basic data flow model of the USB 2.0 specification. Another difference between the disclosed WPAN USB system and a fully compliant USB 2.0 system is that instead of bus 'transaction' that involves token, data, handshake commands at the bus level, the disclosed WPAN USB system 101 can apply the same token, data handshake model to the application I/O transfer level that controls transmissions based on USB Request Blocks (URBs). Applying the token, data, handshake bus transaction controls to the I/O transfer level for URBs provides an improved performance for the disclosed WPAN 130.

Accordingly, during system operation, the query module can query the WPAN devices 118-122 for various characteristics about the devices. For example, what type of service the device 118-122 desires, (i.e. basic data, audio, video, etc.). In other embodiments, the characteristic can be a receive capacity or how many data packets the device 118-122 can receive in one burst. Thus, the CPU host 112 can receive control commands and data (such as the device characteristic data) and via interaction with communication control components 102-108 the CPU-host 112 can control transmission and transmission parameters between the host system 101 and WPAN devices 118-122. The parameters of the transmissions between the transceiver 114 and the WPAN devices 118-122 can include the priorities of transmissions, the speeds of transmissions and the quality of service (QoS) for transmissions to name a few. CPU host 112 via application can generate transmissions. Many arrangements for provisioning the QoS for USB data transfers between the WPAN host 101 and WPAN devices 118-122 over the WPAN network 130 can be performed. Such provisioning can be in accordance with an Institute of Electrical and Electronic Engineers (IEEE) 802.11 format published in 2005. The 802.11a/b/g/n standard is commonly referred to as Wireless Fidelity (WiFi) compatible and WiFi is a branding term often utilized to signify compliance with the IEEE 802.11a/b/g/n standard for wireless LAN.

It can be appreciated that the disclosed embodiments integrate WPAN configuration technology with USB communication control to provide enhanced wireless communication. In some embodiments, the WPAN host 101 can utilize access categories provided by access category module 103, admission control provided by admission control module 102, transmit sizing determination provided by sizing module 108, traffic specification mapping provided by mapping module 106 to control data transmission between the host 112 and the WPAN devices 118-122. Access categories and admission control for USB transfer types are described in IEEE 802.11e.

In some embodiments, admission control for data transmissions having different transfer types can be monitored and controlled by the admission control module 102 and the host CPU 112. Generally, the IEEE 802.11e specification provides for two different kinds of media access. Namely, an enhanced distributed channel access (EDCA) and a hybrid controlled channel access (HCCA). The EDCA and the HCCA standards have mechanisms to monitor/provide QoS solutions for multimedia streaming over 802.11 compatible wireless networks.

IEEE 802.11e is an approved amendment to the IEEE 802.11 standard that defines a set of quality of service (QoS) enhancements for wireless local area network applications through modifications to the media access control (MAC) layer. This standard was adopted to accommodate latency or delay-sensitive applications, such as voice over wireless interne protocol and streaming multimedia. The 802.11e amendment has been incorporated into the published IEEE 802.11-2007 standard.

In some embodiments, the query module can determine the type communication or a classification of transmission that needs to be transmitted. For example, voice, multimedia, printable data, etc. and can select access categories for the specific transmission/communications. Such selected access categories can be based on a QoS that is appropriate for the particular type of communication or device 118-122. The access categories can be prioritized by the access category module 103 at the media access control (MAC) layer. Different access categories can provide different priorities for different types of transmissions such that transmissions between the host 112 and the WPAN devices 118-122 have a QoS that is preferred for a specific type of transmission. Thus, the host CPU 112 can identify certain transmission types and control network transmissions based on the transmission type to provide real-time communications, such as voice or video transmissions, with a higher priority to maintain an acceptable QoS.

In some embodiments, four access categories (ACs) can be assigned by the access category control module 103 based on the determined type of communication. Such access categories can include an access category background (AC_BK), an access category best efforts (AC_BE), an access category video (AC_VI) and an access category voice traffic (AC_VO). In accordance with some embodiments AC_BK can have a lowest priority and AC_VO can have a highest priority. It can be appreciated that when too much latency occurs for voice data transmissions, the communication between users can be choppy and unintelligible. Likewise for streaming video, a higher priority in transmission access will provide higher quality user experience.

The admission control module 102 can enforce admission control for certain access categories based on traffic specification (TSPEC) of IEEE 802.11. The URB to TSPEC conversion can be made by the mapping module 106. This mapping can further parameterize and control the transmission or data flow requirements between the CPU host 112 and the WPAN devices 118-122. The major TSPEC parameters include minimum data rate, maximum service interval, packet delay bound and nominal MAC service data unit (MSDU) size. Thus, whether a WPAN device 118-122 is granted access to a communication link can be determined based on the bandwidth that will be required by the request.

WPAN devices 118-122 can generate and transmit device notification packets to the CPU host 112. These packets can include the standard PAN USB header followed by a type field. The value of the type field can determine the actual length and format of the bytes following the type field. The device notification mechanisms are not intended to be used for large information exchanges, so the data payloads of device notification messages can be limited to 32 bytes.

Generally, when a WPAN USB compatible device (i.e. 118-122) has achieved a configured state or is "connected," the WPAN USB device 118-122 can transmit a bus allocation command to the CPU host 112 to register its operations data structure (i.e. voice, video, etc.). This operation can register the software layer such that the software layer can commit data transfer to the hardware driver. With the software layer and the hardware drivers in place, a specific peripheral driver can register its own driver data structure by invoking the registration process.

In some embodiments the CPU host 112 utilizing a USB client driver application retrieved from memory 105 can set up USB request blocks (URBs) and send the URBs to one or more of the WPAN devices 118-122. USB to WPAN mapping module 104 and the sizing module 108 can define the URB structure that will be sent to the WPAN devices 118-122 by defining the format for URB commands to be utilized for communications between the CPU host 112 and the WPAN devices 118-122. The hardware driver can fill the URB buffers with relevant information and call the proper completion handler when a data transfer occurs. Two types or URB's that can be set up and utilized by the CPU host 112 include interrupt and isochronous URBs as defined under USB 2.0. Generally, these URB's are periodic transmissions that provide transmission control information to the WPAN devices 118-122. Such transmission can be generated by communication control modules 102-108 and sent to WPAN devices 118-122 via the transceiver 114. The interrupt and isochronous URB's can provide control information to the WPAN devices 118-122 indicating such parameters as polling interval (how often requests are made) and transfer length (amount of the data transmitted). Thus, the CPU host 112 can dictate how often a WPAN device 118-122 can perform data transfers and how long such transfers can be possibly dictated by the sizing module 108. The sizing module 108 can process isochronous URB transmissions to determine and specify the number of packets in each transmission where each transmission can be viewed as an individual transfer.

In some embodiments, the CPU host 112 can determine the classification of data to be sent to the WPAN devices 118-122 (voice, video, etc.) and utilize the admission control module 102, the mapping module 104, the sizing module 108 and the access category module 102 to determine and regulate the communication parameters that will be utilized for different communications. For example, a transmission received from the wide area network 116 can be assigned an access category by access category module 103 and the CPU host 112 can map the WPAN USB packets into one of the four EDCA access categories mentioned above according to the rules in the mapping module 104. The mapping can occur based on the USB transfer type that is selected by communication controllers 102-108 and Tables 1 and 2 below. The mapping module 104 can map communication according to Table 1 below.

TABLE 1

| USB Transfer Type | LAN Access Category |
|---|---|
| CONTROL | Best Effort |
| BULK | Best Effort |
| INTERRUPT | Voice |
| ISOCHRONOUS | Voice |

As illustrated above, the mapping can be as follows a control USB transfer type can be mapped to a best efforts access category, a bulk USB transfer type can be mapped to a best efforts access category, an interrupt USB transfer type can be mapped to a voice access category and an isochronous USB transfer type can be mapped to a voice access category as illustrated in Table 1.

An application that wishes to use the WPAN to transport traffic with a specific QoS must first request a connection, which involves informing the CPU host 112 about the characteristics of the proposed traffic and the QoS required by the application/device/endpoint (118-122). This information can be stored in memory 105 as a traffic contract. The sizing module 108 and the admission control module 102 can determine whether the system has enough resources available to accept the connection, and then can either accept or reject the connection request. Admission control is useful in situations where a certain number of connections (phone conversations, for example) may all share a link, while an even greater number of connections causes significant degradation in all connections to the point of making them all useless, thus preventing a congestion collapse.

When the CPU host 112 enforces admission control, the QoS parameters in an interrupt or isochronous URB request can be mapped to the appropriate TSPEC parameters by the USB to TSPEC mapping module 106. This can provide an improved bandwidth for the higher priority transmissions. The admission control module 102 can determine how bandwidth and latency are allocated to streams with various QoS requirements. The admission control scheme herein can be implemented between network edges (devices 118-122) and the core CPU host 112 to control the traffic entering the WPAN. Admission control is generally considered a network (QoS) procedure.

As stated above, an application at the CPU core 112 that wishes to use the network to transport traffic with a specific QoS must first request a connection from the CPU host 112. Such a request can include informing the CPU host 112 about the characteristics of the traffic and the QoS required by the application. This information can be stored as a traffic contract in memory 105. The admission control module 102 can determine whether the network has enough resources available to accept the connection, and then can either accept or reject the connection request and communicate such a decision to the application The URB requests can be mapped to the appropriate TSPEC parameters (according to the 802.11 specification for wireless LANs) via URB to TSPEC mapping module 104. A possible translation of the parameters that could be utilized by the mapping module 106 to convert URB parameters to TSPEC parameters is presented below in Table 2. It can be appreciated that the last two parameters, the packet delay bound and the nominal MSDU size apply to isochronous transfers only for higher QoS performance.

When a peripheral device generates a LAN compatible transmission with a TSPEC parameter the host can utilize the TSPEC parameter to create a traffic contract and the host can utilize the TSPEC parameter to create a communication channel based on the TSPEC parameters to control the transmission with URB's.

TABLE 2

| TSPEC Parameter | URB Parameters |
| --- | --- |
| Minimum Data Rate | Transfer Length/Polling Interval |
| Maximum Service Interval | Polling Interval |
| Packet Delay Bound (ISO only) | Polling Interval/Number of Packets |
| Nominal MSDU Size (ISO only) | Transfer Length/Number of Packets |

The disclosed conversion arrangements provide improved QoS guarantees for different USB transfer types over the "less reliable" WPAN Layer. Such a configuration creates multiple pipes with different "qualities" as opposed to sending all USB traffic through a single "best effort" pipe. Sending all USB traffic through a single "best effort" pipe or channel often cannot satisfy the QoS requirements of certain real-time communications such as video or voice.

It can be appreciated that, communications that utilize interrupt and isochronous transfers often need a higher priority channel to maintain an acceptable QoS. The disclosed arrangements that map the USB transfer type to an access category and a USB parameter to TSPEC parameters and allow WPAN USB communications to utilize the QoS capabilities defined by 802.11e.

Figure 2:
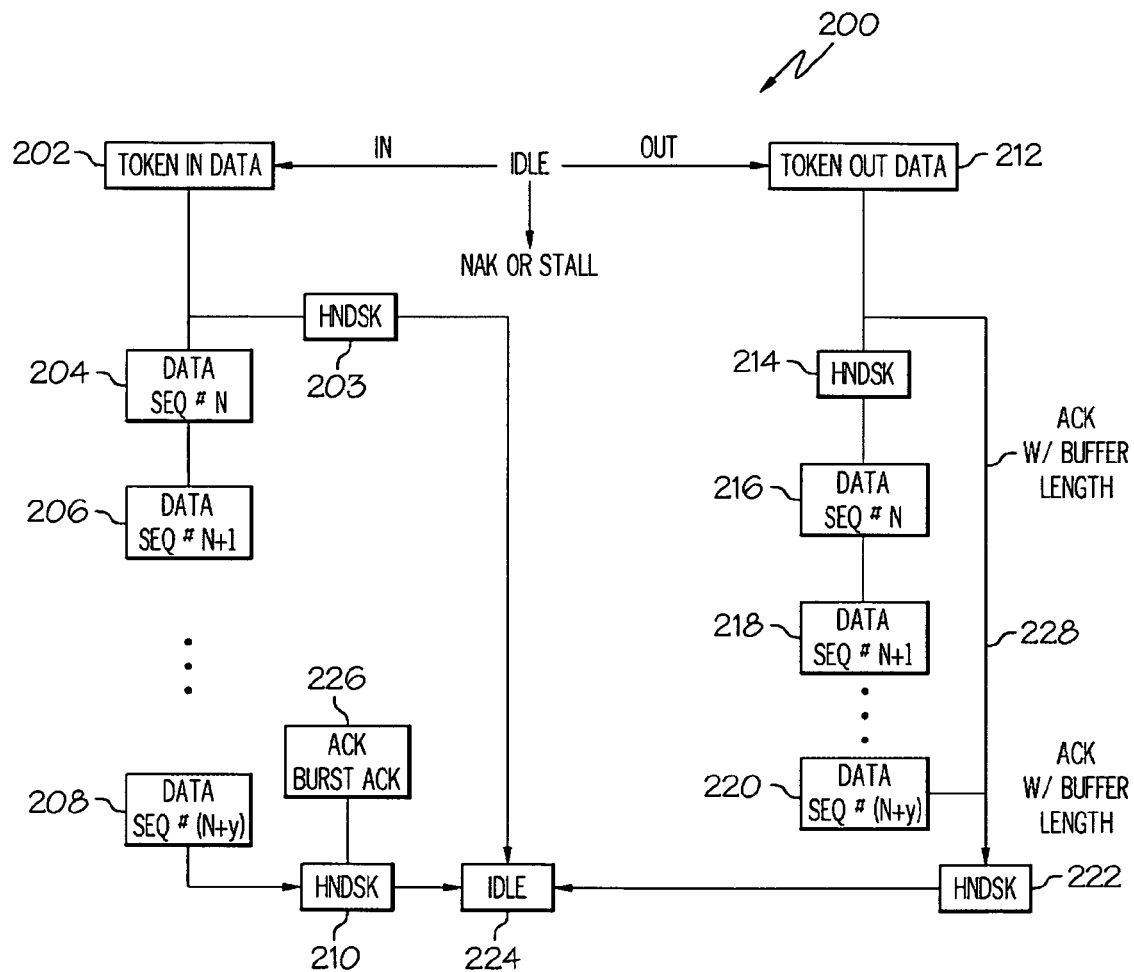
FIG. 2 is a flow diagram for a flow control system.

Referring to FIG. 2 a flow diagram for WPAN USB communication control is illustrated. The general WPAN USB communications topology disclosed can utilize URB's and thus is very similar to the communication topology defined by USB 2.0. This similarity allows the disclosed arrangement to be legacy compliant. For example, existing USB 2.0 compatible functional components (in hosts and devices) will continue to work without modification. In accordance with the present disclosure, physical layer software components can be implemented in a host that supports legacy USB 2.0 devices. The disclosed arrangements can utilize the flow control mechanisms described in FIG. 2 where legacy system can operate, communicate and perform flow control in a legacy format or in the modified format. Generally, a USB bus can handle only one communication at a time where the wireless USB system disclosed can create multiple channels and thus simultaneously communicate with multiple devices.

In order to change from the USB 2.0 specification to the disclosed WPAN USB, the function layer can remain substantially the same as it is implemented in traditional USB communications. However, the timing of the isochronous and interrupt transfers can be placed in a local area network (LAN) channel that is allocated for voice. A voice LAN channel has a higher quality and thus, a high performance USB transaction can be assigned a high performance LAN channel. Such an enhanced LAN channel allows devices to improve the inherent unreliability of the WPAN layer.

FIG. 2 depicts flow control for USB data transfers between a WPAN host and WPAN compatible devices. It can be appreciated that the disclosed WPAN USB data transfers can be free from USB bus restrictions. For example multiple data transfers can be performed simultaneously. The WPAN USB provided includes the capability to send multiple data packets concurrently during the data transfer phase of the transaction. This multi channel feature allows the LAN to achieve higher efficiency because the transaction overhead is significantly reduced. It can be appreciated that between an initial handshake and an error correction handshake multiple data packets can be sent.

The size of each data packet in a data burst can be the maximum packet size for the WPAN device. For isochronous streams, the size of the data packet may not be the maximum packet size for the WPAN device. A short packet can be defined where the application data area in a packet is not filled with application data. The amount of user data in the packet can be signaled via the data length parameter in the packet header.

As illustrated by FIG. 2 transactions nominally consist of three phases, a token phase, where a device is elected for communication, a data phase where data is sent and a handshake phase where reception of the transmission is acknowledged. It can be appreciated that the application level input-output transfer can be much larger than a USB Bus transaction because the amount of packets is limited by the capacity of the WPAN device.

A general transfer format for a WPAN device that utilizes a USB communication format is disclosed in FIG. 2. As illustrated by block 201, when a host is ready to receive data, it can create and transmit "TOKEN IN" command or generate a request specifying the number of data packets to be transferred or the "transfer size" of the data. If the destination device or "function endpoint" successfully receives the token, then the WPAN device can reply with a handshake transmission.

After the "token in" transmission occurs, as illustrated at block 202 the CPU host can listen for data packets from the WPAN device. The CPU host can monitor the sequence numbers of the received data packets and can advance a receive window according to the number of packets received. This is indicated by relieving sequence number N at block 204, sequence N=1 at block 206 and sequence number N+Y at block 208. An acknowledgement of which data packets the CPU host has received without error can be transmitted back to the WPAN device in handshake packet 210.

After the handshake transmission, as illustrated in block 210, the system can return to an idle state as illustrated by block 224. All data packets in a transaction, except possibly the last one, can have a length equal to the maximum packet size of the corresponding endpoint function. The last packet in a transfer can have an attributes field of last packet flag set. A transaction can be aborted by the PAN USB host at any point of time by transmitting an Abort packet. In other embodiments if the transmitter sends a packet with a transfer identification field that is not associated with a valid token, the receiver must ignore the packet.

When the CPU host has data ready to transmit to a WPAN device the CPU host can transmit a "token out" command/request specifying the size of the data transfer as illustrated by block 212. The data payload portion of the packet can be utilized to convey the first data packet in the data transfer as illustrated by blocks 216, 218 and 220. The WPAN device can return a handshake packet specifying the buffer size available at the WPAN device as illustrated by block 214. After the handshake is complete, the CPU host can send data packets as illustrated by blocks 216, 218, and 220. The blocks 216-220 illustrate a data "OUT" burst configuration. During the data transmission phase, the host can transmit a burst of data packets based on the state of the host's transmit window. After reception of the data packets by the WPAN device the WPAN device can send a handshake back to the CPU host as illustrated by block 222.

The handshake can acknowledge receipt of the data packet conveyed in the transfer request. In the event that the WPAN device is unable to receive data, the WPAN device can return a handshake packet encoded with a NAK or STALL handshake code as illustrated by dashed line 228 and by block 222. After a data "OUT" burst an acknowledgement signal indicating which data packets that the function endpoint received without error can be communicated back to the host in a the handshake packet illustrated by block 220 and based on this transmission the CPU host can retransmit missing packets.

An acknowledgement or (ACK) transmission can be sent to acknowledge a single data packet while a burst ACK transmission can be utilized to deliver the state of the receiver's window. This handshake or acknowledgement information allows the sender to know which packets need to be retransmitted. It can be appreciated that one or more (up to all) of the data packets transmitted during the data phase may be corrupted and not properly received by the WPAN device or function endpoint. When the host does not successfully receive the handshake packet, the host can transmit a burst ACK request packet as illustrated by block 222 and the WPAN device can respond with a burst ACK handshake packet.

The NAK command, as illustrated by block 222, can be transmitted from the WPAN device and can indicate that the WPAN device did not accept or properly receive the data transmitted by the host during the data phase. The NAK command can also act as a flow control response in response to a token command indicating that the WPAN device is in a temporary condition preventing it from accepting any of the data. For example, the WPAN device can send a NAK command if its receiving buffer is full and it is unable to receive data when the request is made via a token command. The host can enter a delay mode and then resend a token and the data to the WPAN device at a later time when the WPAN device is ready. The time when the data can be sent may depend on the transfer type assigned to the WPAN device such that a quality communication link can be maintained. The STALL command can be utilized by the WPAN devices that are assigned bulk and interrupt USB transfer types to indicate that the WPAN device is halted. When the WPAN device is halted the host can refrain from attempting to retry transmissions because it is likely that there is an error condition associated with the function.

It can be appreciated that the flow control scheme illustrated overcomes drawbacks inherent with USB network protocols that require numerous exchanges of token, data and handshake packets for a single URB transaction. The disclosed flow control achieves a high throughput by removing all "non-inherent" performance bottlenecks associated with USB Bus inefficiencies rather than the device capabilities and at the same time "guaranteeing" reliable data delivery. The disclosed flow control scheme allows a USB compatible WPAN connectable device to utilize the high throughput capabilities associated with 802.11n compliant communications by using different channels and the flow control mechanisms can differentiate between a WPAN USB device compatible with WiFi communications format and a Wireless USB system that is based on ultra wide band (UWB) communication format.

The disclosed arrangements can differentiate between the wireless USB and hardwired USB devices because it can allocate and utilize various types of network channels in response to the application that resides on the WPAN device. In contrast to a Wireless USB configuration, the WPAN USB configuration disclosed is based on a WiFi network protocol configuration and not on an ultra wide band (UWB) network protocol configuration. Contrary to "Extreme USB", as defined under IEEE 802.11, the disclosed WPAN USB configuration can be controlled based on the level of the USB application data transfers (dictated by the device application) and not by the level of USB bus transaction descriptor (TDs) (i.e. token, data, and handshake). Application (I/O) transfers generally provide improved communication control and thus better network performance for wireless environments.

In addition, the disclosed WPAN USB configuration is different from USB/IP protocol that encapsulates USB I/O requests into IP packets and transmits them between devices. Furthermore, the disclosed WPAN USB is different from "USB Anywhere" because the disclosed WPAN USB uses native 802.11e QoS mechanisms and not general TCP/IP interface as utilized by the USB/IP and anywhere USB. Using such an improved flow control, the disclosed WPAN USB can provide high performance flow control to improve the QoS in historically unreliable wireless environment. The disclosed WPAN USB configuration can avoid utilizing transmission control protocol/Internet protocol (TCP/IP) layer to control the transmissions. This is beneficial because a transmission control protocol (TCP) stack is often not available in WPAN devices.

Accordingly, the general communications topology of WPAN USB can be viewed as substantially identical to that utilized in the legacy USB 2.0 specification. One advantage of this legacy compatibility is that many existing USB 2.0 functional components (in hosts and devices) will continue to work with new devices without modification when the physical layer components supporting USB 2.0 are replaced with software supporting WPAN USB.

Figure 3:
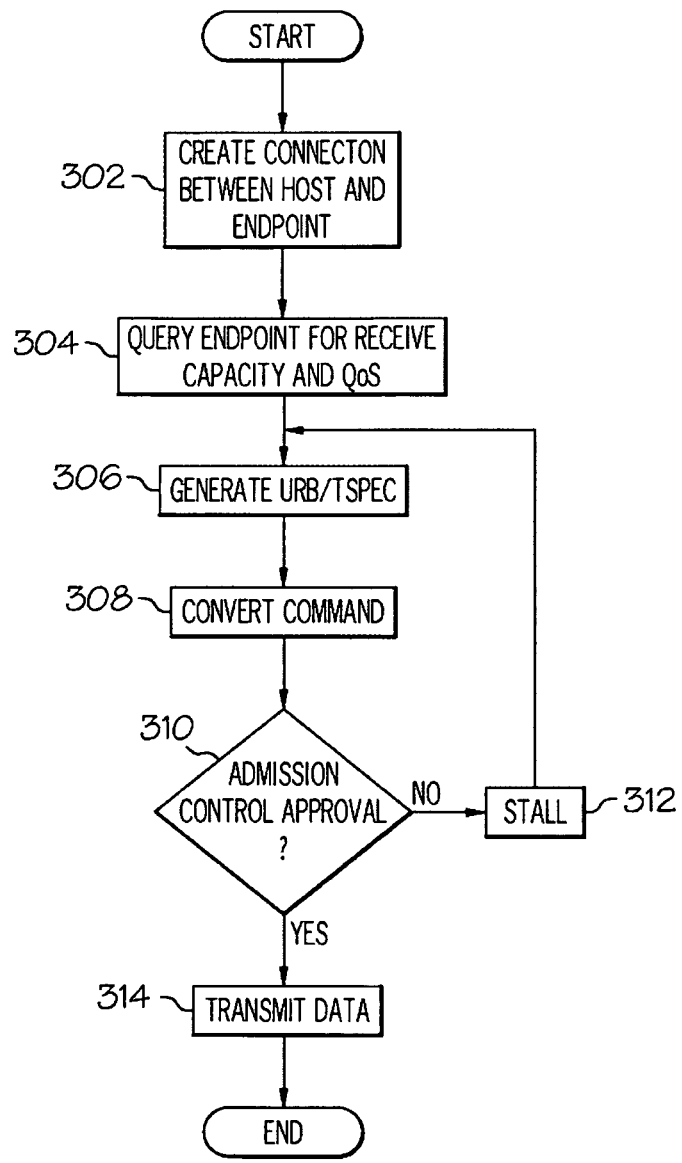
FIG. 3 is a flow diagram for controlling communications in a network.

Referring to FIG. 3 a flow diagram of a method of wireless network communications is disclosed. As illustrated by block 302 a connection between a host device and an end point or a peripheral device can be created. Such a process is often referred to as "plugging in." As illustrated in block 304 a host can query an endpoint for a receive capacity or a buffer length capacity and a desired quality of service, or class of connection. A transmission can be admitted, and control parameters set as illustrated in block 306.

The USB type control parameters can be converted to network transmission control parameters. In some embodiments the network transmission control parameters can be in compliance with the IEEE 802.11 specification. As illustrated by decision block 310, the system can determine if the transmission can be sent in accordance with admission control guidelines. If admission control is not granted, then the system can stall as illustrated by block 312 and a retransmission can be tried later. If admission control grants admission, then the data can be transmitted as illustrated by block 314. The process can end thereafter.

The disclosed WPAN USB can also provide analogs to USB 2.0 device signaling events such as connect, disconnect, etc. This class of information exchange is characterized as short (small), point-to-point, device to host (upstream), infrequent and asynchronous. The individual device notification packets are not acknowledged by the host and devices should track response and retransmit device notifications as necessary.

An implementation of the process described above, may be stored on, or transmitted across some form of computer readable media. Computer readable media can be any available media that can be accessed by a computer. By way of example, and not limitation, computer readable media may comprise "computer storage media" and "communications media." "Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Reference to particular configurations of hardware and/or software, those of skill in the art will realize that embodiments may advantageously be implemented with other equivalent hardware and/or software systems. Aspects of the disclosure described herein may be stored or distributed on computer-readable media, including magnetic and optically readable and removable computer disks, as well as distributed electronically over the Internet or over other networks, including wireless networks. Data structures and transmission of data (including wireless transmission) particular to aspects of the disclosure are also encompassed within the scope of the disclosure.

Each process disclosed herein can be implemented with a software program. The software programs described herein may be operated on any type of computer, such as personal computer, server, etc. Any programs may be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet, intranet or other networks. Such signal-bearing media, when carrying computer-readable instructions that direct the functions of the disclosed arrangements, represent embodiments of the present disclosure.

The disclosed embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A data processing system suitable for storing and/or executing program code can include at least one processor, logic, or a state machine coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be apparent to those skilled in the art having the benefit of this document that the present disclosure contemplates methods, systems, and media that provide different modes related to a VU. It is understood that the form of the invention shown and described in the detailed description and the drawings are to be taken merely as examples. It is intended that the following claims be interpreted broadly to embrace all the variations of the example embodiments disclosed.

As one of ordinary skill in the art will readily appreciate from the teachings herein processes, machines, manufacture, compositions of matter, or methods presently existing or later to be developed that perform substantially the same function or achieve substantially the same result as the corresponding embodiments described herein may be utilized according to some embodiments of the invention. Accordingly, the appended claims are intended to include within their scope such processes, machines, manufacture, compositions of matter or methods.

What is claimed is:

1. A method comprising:
achieving, by a system, a wireless network connection status between a host device and a peripheral network device;
determining, by the system, a characteristic of the peripheral device;
generating a universal serial bus request block, the universal serial bus request block having at least one parameter;
generating by the system a wireless network control command in response to the universal serial bus request block; and
executing by the system, the wireless network control command, to transmit data over the wireless network connection between the host device and the peripheral network device, wherein transmitting data comprises:
transmitting a transmission request token;

receiving a handshake reply after transmitting the transmission request token;

transmitting a burst transmission after receiving the handshake reply; and receiving an acknowledgement of the transmission after transmitting the burst transmission.

2. The method of claim 1, wherein:

the method further comprises determining a maximum packet size; and the transmitting a burst transmission comprises:

transmitting a plurality of packets; and requiring that the size of each packet is equal to the determined maximum packet size, except for isochronous streams and short-packet situations.

3. The method of claim 1, wherein the receiving an acknowledgement comprises receiving an error detection type handshake.

4. The method of claim 1, wherein the receiving an acknowledgement comprises receiving a burst acknowledgement.

5. A tangible machine-readable storage medium containing instructions which, when the instructions are executed by a machine, cause the machine to perform operations, comprising:

achieving, by the machine, a wireless network connection status between the machine and a peripheral network device;

determining, by the machine, a characteristic of the peripheral device;

generating a universal serial bus request block, the universal serial bus request block having at least one parameter;

generating by the machine a wireless network control command in response to the universal serial bus request block; and executing by the machine, the wireless network control command, thereby transmitting data over the wireless network connection between the machine and the peripheral network device, wherein the transmitting data comprises:

transmitting a transmission request token;

receiving a handshake reply after transmitting the transmission request token;

transmitting a burst transmission after receiving the handshake reply; and receiving an acknowledgement of the transmission after transmitting the burst transmission.

6. The tangible machine-readable storage medium of claim 5, wherein:

the tangible machine-readable storage medium further contains instructions which, when executed by the machine, cause the machine to determine a maximum packet size; and the instructions to transmit a burst transmission comprise instructions to:

transmit a plurality of packets; and require that the size of each packet is equal to the determined maximum packet size, except for isochronous streams and short-packet situations.

7. The tangible machine-readable storage medium of claim 5, wherein the instructions to receive an acknowledgement comprise instructions to receive an error detection type handshake.

8. The tangible machine-readable storage medium of claim 5, wherein the instructions to receive an acknowledgement comprise instructions to receive a burst acknowledgement.

9. An apparatus to achieve a network connection status between a host device and a peripheral network device, the apparatus comprising:

a communication control module to achieve a wireless network connection status between the host device and the peripheral network device; and a processing unit coupled with the communication control module to:

determine a characteristic of the peripheral device;

generate a universal serial bus request block, the universal serial bus request block having at least one parameter;

generate a wireless network control command in response to the universal serial bus request block, wherein the communication control module is further to:

execute the wireless network control command, thereby transmitting data over the wireless network connection between the host device and the peripheral network device, wherein the transmitting data comprises:

transmitting a transmission request token;

receiving a handshake reply after transmitting the transmission request token;

transmitting a burst transmission after receiving the handshake reply; and receiving an acknowledgement of the transmission after transmitting the burst transmission.

10. The apparatus of claim 9, wherein:

the processing unit is further to determine a maximum packet size; and the transmitting a burst transmission comprises:

transmitting a plurality of packets; and requiring that the size of each packet is equal to the determined maximum packet size, except for isochronous streams and short-packet situations.

11. The apparatus of claim 9, wherein the receiving an acknowledgement comprises receiving an error detection type handshake.

12. The apparatus of claim 9, wherein the receiving an acknowledgement comprises receiving a burst acknowledgement.

* * * * *